United States Patent [19]

Streit

[11] 4,281,860
[45] Aug. 4, 1981

[54] KEY COUPLED PLASTIC CONDUITS

[75] Inventor: Kenneth F. Streit, Mt. Prospect, Ill.

[73] Assignee: Techplastics, Inc., West Chicago, Ill.

[21] Appl. No.: 61,355

[22] Filed: Jul. 27, 1979

[51] Int. Cl.³ ............................................. F16L 39/00
[52] U.S. Cl. ............................ 285/137 R; 285/305; 285/403; 138/117
[58] Field of Search ................. 285/305, 137 R, 403; 138/117, 155

[56] References Cited

U.S. PATENT DOCUMENTS

| | | | |
|---|---|---|---|
| 1,881,980 | 10/1932 | Thomas, Jr. | 285/305 |
| 2,013,660 | 9/1935 | Lauer | 285/305 |
| 2,597,482 | 5/1952 | Harrison et al. | 285/305 |
| 2,760,518 | 8/1956 | Peet | 285/305 X |
| 3,220,754 | 11/1965 | Mori | 285/305 |
| 3,239,244 | 3/1966 | Leinfelt | 285/305 X |
| 3,600,011 | 8/1971 | Alvis | 285/305 |
| 3,606,402 | 9/1971 | Medney | 285/305 |
| 3,759,553 | 9/1973 | Carter | 285/305 X |
| 3,872,894 | 3/1975 | Streit | 138/155 |
| 3,913,954 | 10/1975 | Klimpl | 285/305 |

FOREIGN PATENT DOCUMENTS 1310712 10/1962 France ..................................... 285/305
1230857 5/1971 United Kingdom ..................... 285/305

*Primary Examiner*—Thomas F. Callaghan
*Attorney, Agent, or Firm*—Dressler, Goldsmith, Shore, Sutker & Milnamow, Ltd.

[57] ABSTRACT

A plastic conduit section of the bell and spigot variety for protecting electrical and communications cable, featuring paired, parallel, ridged spigots or channeled spigots, slotted bells, and resilient tie rods or keys to join adjacent conduit sections together. Interrupted peripheral keyways and resilient keys are used to join adjacent conduit sections together. These conduit sections may be internally divided into smaller subcompartments. A circumferential gasket seals the joint between the spigot and the bell ends. Flanged end surfaces limit axial movement and deflection. Lipped ends index and seat adjacent conduit sections for subsequent joining.

10 Claims, 11 Drawing Figures

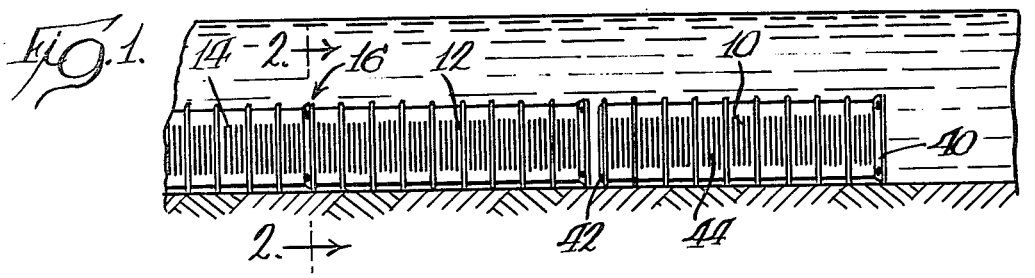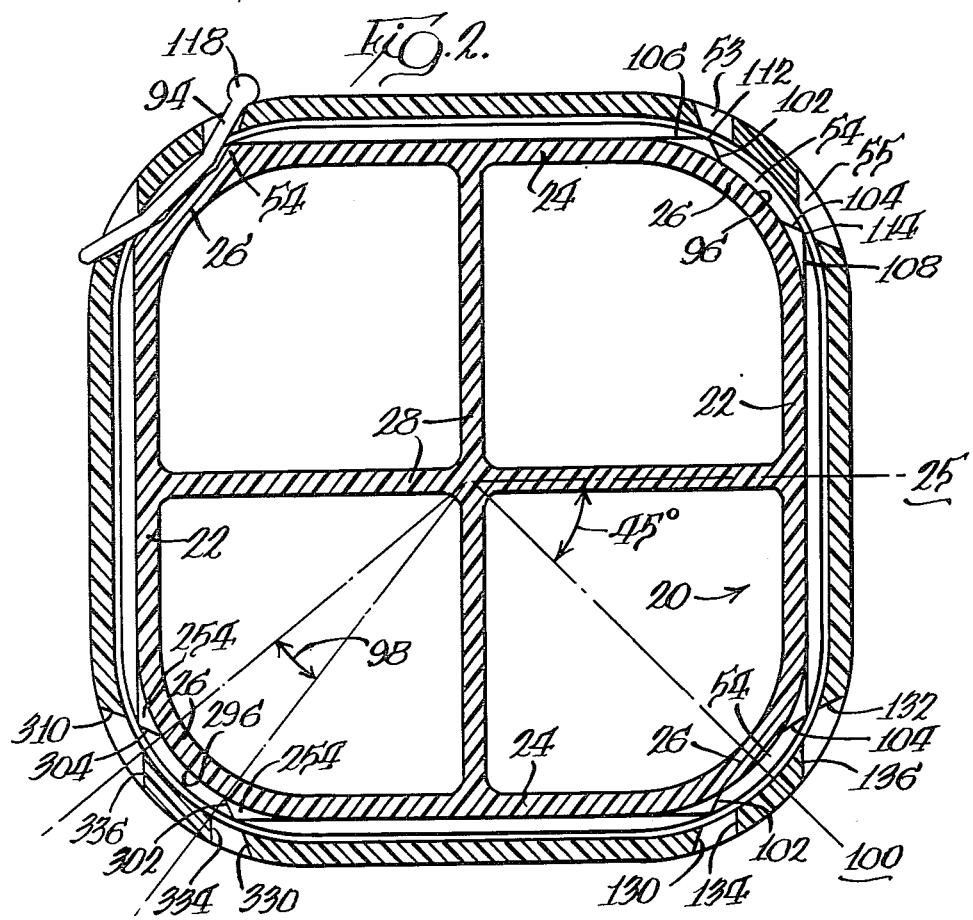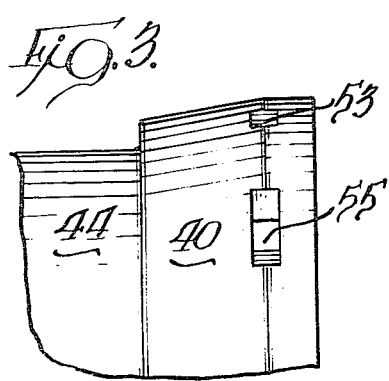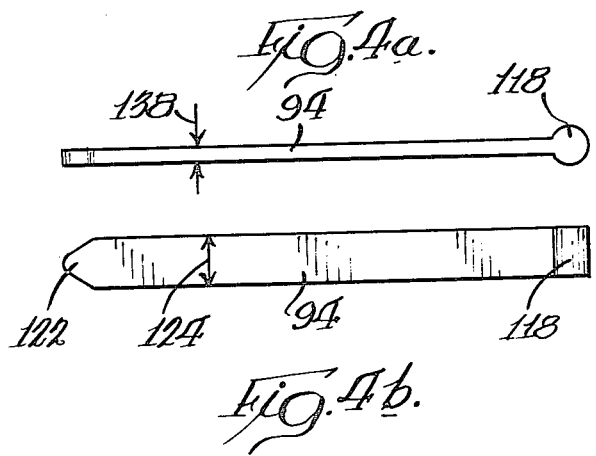

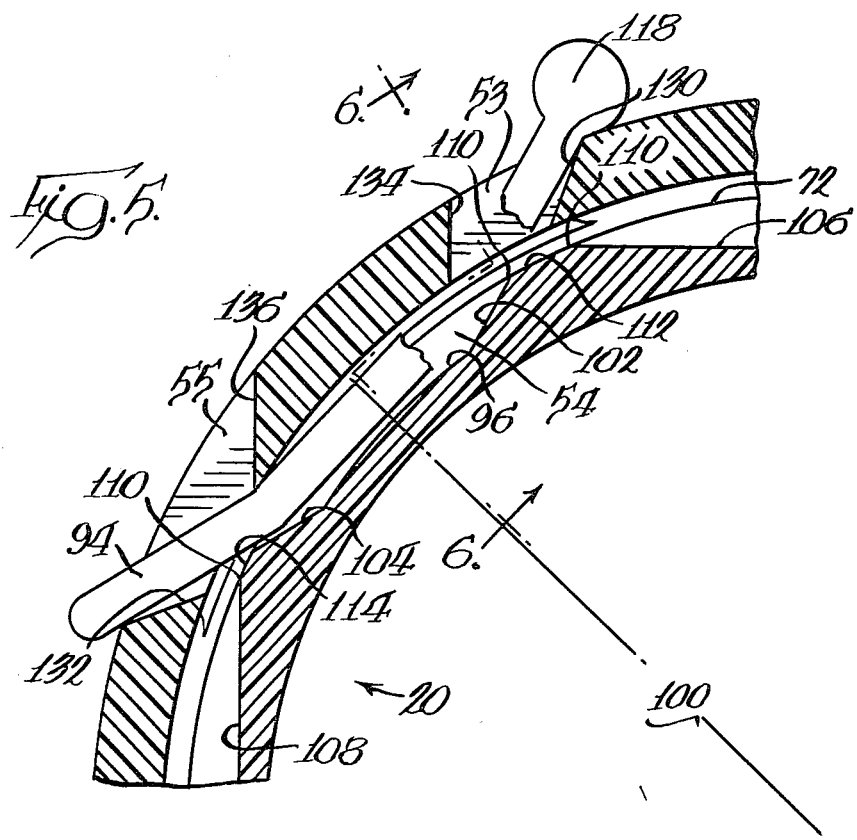
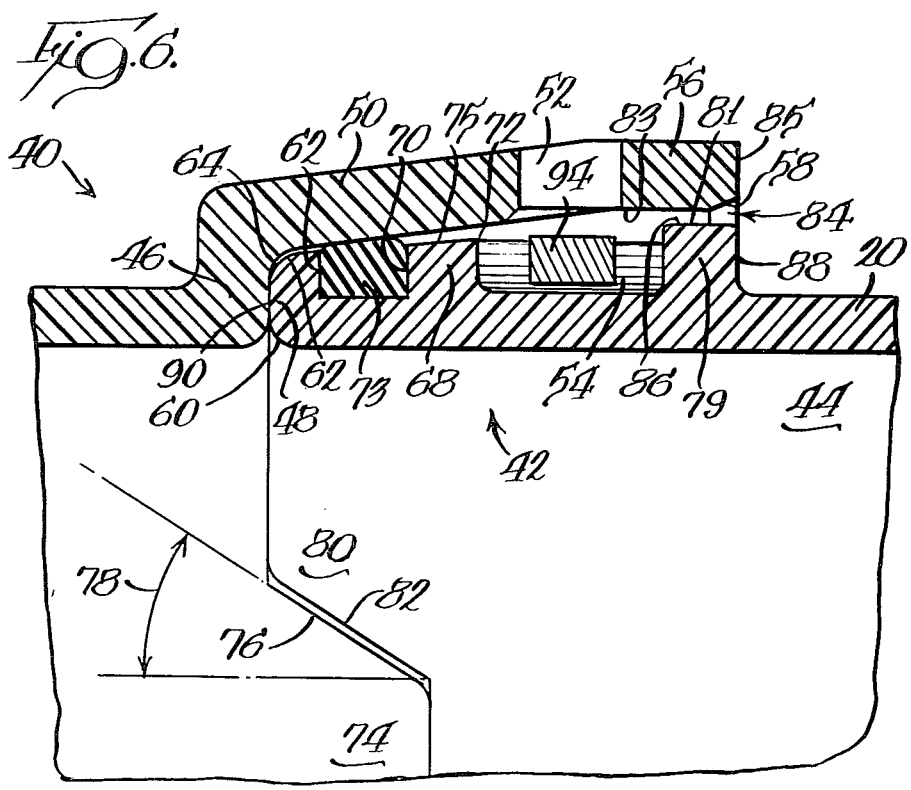

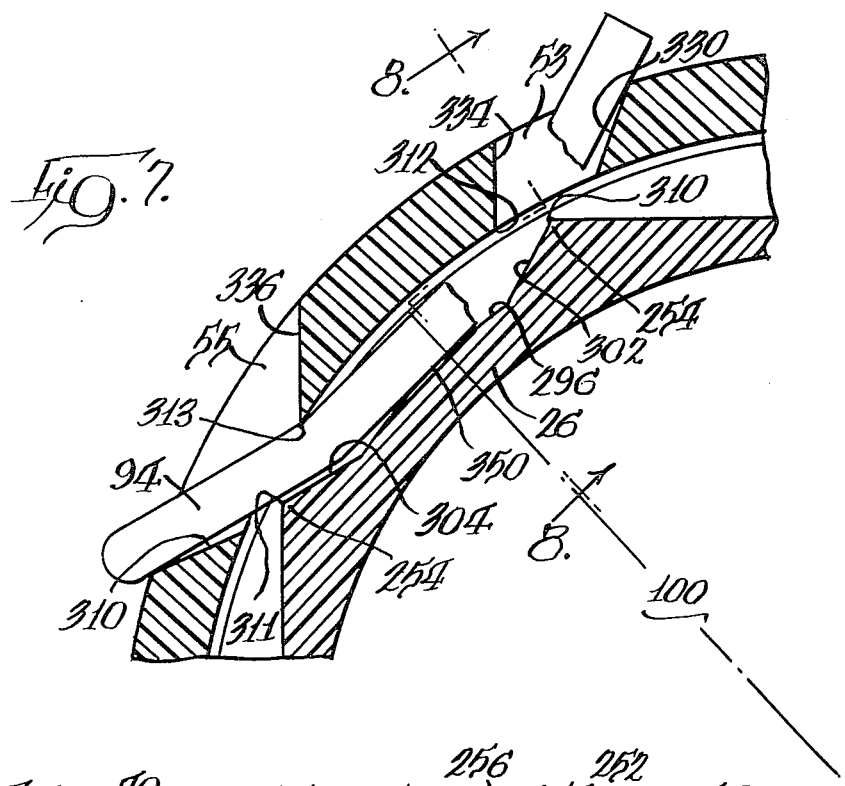
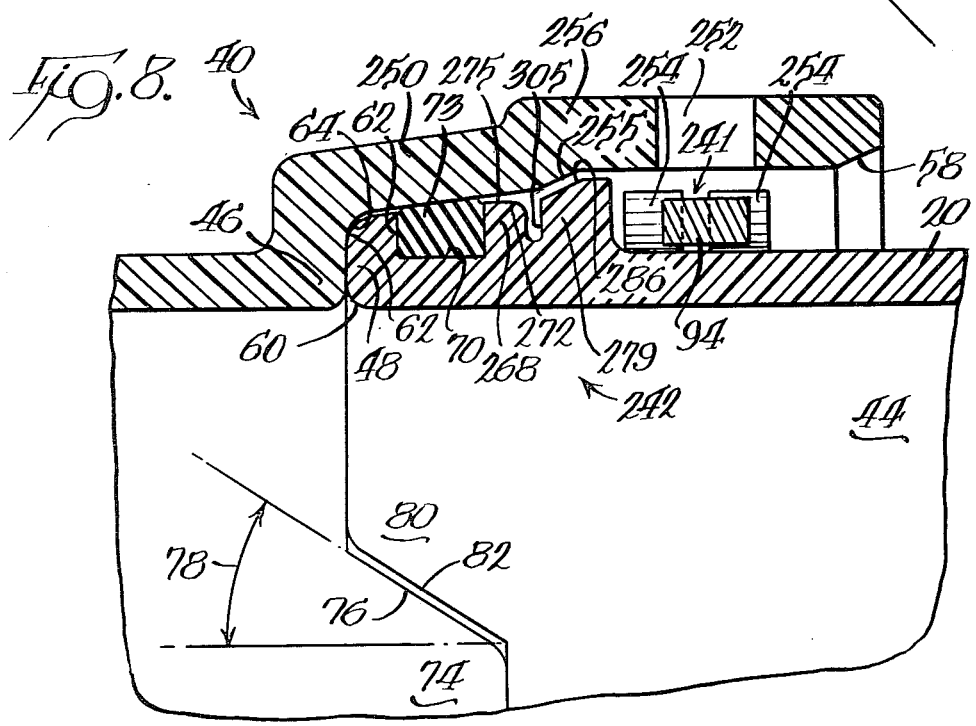
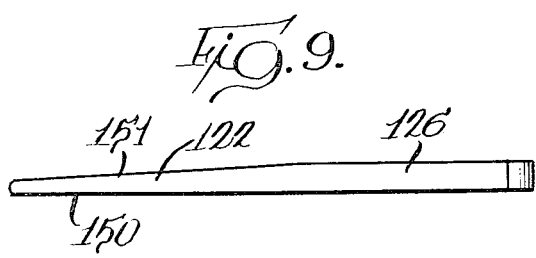
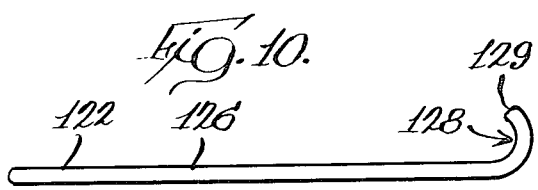

KEY COUPLED PLASTIC CONDUITS

DESCRIPTION

TECHNICAL FIELD

The present invention relates to plastic conduit and, in particular, to the means by which adjacent conduit sections are joined together.

The bell and spigot coupling method for pipe or conduit buried underground has found a considerable degree of acceptance in the industry. Because burial underground is expensive and trouble-shooting is difficult, if not impossible, the method used to couple ducts or conduit sections carrying electrical and tele-communications lines must be trouble-free and reliable. Long-term reliability necessitates the use of materials which are not adversely affected by the hostile environment surrounding a buried structure. Moisture must be kept from entering the the inside of the conduit. In addition, settlement of the surrounding ground must be taken into consideration. For these reasons, relatively inert materials should be used to hold the conduit sections together. Preferably, the coupling means should be inexpensive and easy to install.

Spring clips used to join adjacent conduit structures can slip off and are subject to long-term deterioration by corrosion. In addition, if corrosion resistant metalic materials are used, expense is increased.

BACKGROUND ART

Bell and spigot ends are commonly provided for pipes or conduit that are adapted to be buried underground. The bell and spigot joining possesses flexibility and provides for expansion and contraction. It is largely used for water and sewer pipe. More recently, it has been used to seal the conduits or ducts used to route telephone and electrical cable underground. Traditionally, bell and spigot end joints are prepared by tightly tamping or inserting a hemp or jute sealant at the bottom of the recess formed between the bell and spigot ends and then pouring in molten lead; after cooling, the lead is calked in tightly to form a gas-tight joint.

While poured joints require no special end preparation of the pipe or close diametrical control during manufacture, they cannot absorb axial movement without leaking. In addition, disassembly must be accomplished by cutting the pipe.

U.S. Pat. No. 3,792,878 by Freeman describes a plastic conduit system wherein adjacent conduit sections are held together by spring clips. Such clips are made of metal. Since they are buried with the conduit underground, these clips can undergo corrosion and deterioration. Eventually they may disintegrate and lose their holding power. Consequently, water and silt can gradually flow into the conduit. In addition, since mechanical and watertight integrity will deteriorate, subsequent settling of the surrounding soil may break the two sections apart resulting in accelerated seepage of water and mud into the entire conduit system. Long-term watertight integrity is important for conduit systems used to carry telephone and communication cable underground. The invention described herein offers an improved coupling system for such conduit networks, features all plastic construction, increased reliability, and low cost.

SUMMARY

Among conduit systems of the conventional bell and spigot variety, a mechanical keylock using plastic resilient keys may be used to hold together adjacent conduit sections. Two variations are described. Both employ spigot ends generally described by three concentric flanges. The first flange acts as a lipped seat to index and align the conduit sections. The first and second flanges define a groove or slot into which a gasket is inserted to seal the joint between two adjacent conduit sections. The third flange is located differently in the two embodiments described; nevertheless, in both conduit types, the third flange acts to limit axial deflection of the two sections in that it acts as a seat to stop the axial displacement when it contacts the corresponding inside surface of the bell.

In the first embodiment described, a number of open ended channels are formed between the second and third flanges along the radial elements of the enclosing wall means of the spigot end. In the second embodiment a number of paired parallel ridges are formed on the radial elements of the enclosing wall means of the spigot end adjacent to the third flange but on the side of the flange opposite to the sealing gasket. These ridges are analogous to the channel of the first embodiment.

In both cases, slots are provided in the bell ends at locations corresponding to the endpoints of the channels or ridges. Flexible pins or keys then pass through the slots and complementary ridges or channels on the spigot end to key lock the two conduit sections or end portions together.

The pins or keys are made of resilient plastic material, while the conduits may be made of a foam injection molded plastic material. Thus, the pins are more flexible than the conduits. Directional flexibility in the keys is achieved by forming them with a cross-section in the shape of a rectangle. Thus, the pins are more flexible in the direction of the wide sides. The keys are pointed for easy insertion and may have a protuberance at the opposite end to limit the insertion of the pins. The keys in their keyways mechanically join the bell end to the spigot end of two adjacent conduit sections.

BRIEF DESCRIPTION OF THE SEVERAL VIEWS OF THE DRAWINGS

In the accompanying drawings forming part of the specification, and in which like numerals are employed to designate like parts throughout the same:

FIG. 1 is a side elevational view illustrating several conduit sections of the present invention installed in a trench;

FIG. 2 is an enlarged cross-sectional view taken generally along plane 2—2 of FIG. 1.

FIG. 3 is a fragmentary side elevational view of the bell end of a conduit section;

FIG. 4a and 4b are side and top views, respectively, of a key in accordance with the present invention;

FIG. 5 is an enlarged view like FIG. 2 and showing the connection means at one corner of the conduit section;

FIG. 6 is a sectional view taken generally along plane 6—6 of FIG. 5;

FIG. 7 is like FIG. 5 and showing view of of the second embodiment of the invention;

FIG. 8 is a sectional view taken generally along plane 8—8 of FIG. 7.

FIG. 9 is a plan view of a modified key in accordance with the present invention; and FIG. 10 is a side elevational view of still another key for use with the present invention.

DETAILED DESCRIPTION

While this invention is susceptible of the embodiment in many different forms, there has been shown in the drawing and will herein be described in detail preferred embodiments of the invention with the understanding that the present disclosure is to be considered as an exemplification of the principals of the invention and is not intended to limit the invention of the embodiments illustrated.

Referring to FIG. 1, a plurality of conduit sections 10, 12 and 14 are illustrated in the typical manner in which they are installed in a trench which has been excavated to a desired depth. Each of the conduit sections illustrated in FIG. 1 is substantially identical in construction and configuration. Each is preferably made from a high impact plastic, such as linear polyethylene which may readily be injection molded. Because of their light weight, several sections may be conveniently joined together prior to loading in the trench. Adjacent conduit sections are then joined by mating them together and then inserting the plastic keys into the keyways so as to form a unitary structure 16.

The configuration of the coupled conduit sections is generally illustrated in FIG. 2. Each conduit section consists of an elongated smooth surfaced enclosure defined by one or more walls 20, which, for purposes of illustration, may include a first pair of flat walls 22 and a second pair of generally flat parallel walls 24 perpendicular to walls 22 with the ends of adjacent pairs of walls interconnected by radial portions 26.

The enclosure defined by walls 20 may be divided into a plurality of passageways (i.e., four are shown in FIG. 2) by transverse partition walls means 28 which: are injection molded, are integral with wall means 20, and form a grid-like internal wall structure when viewed from the end of the conduit section.

Walls 22, 24 and 26 are a given thickness and may be reinforced to substantially increase the resistance of the walls to withstand pressure and loads to which the conduit may be subject to while buried underground. A preferred method of reinforcement is disclosed in U.S. Pat. No. 4,096,887, the portions of which are consistent herewith being incorporated herein by this reference.

Referring to FIGS. 6 and 8, in order to provide columnlike support to the joint between two adjacent coupled conduit sections, the partition walls 28 project outwardly from one end of the enclosing walls 20 and into the opposite end of the adjacent conduit section providing inclined projections 74 having a U-complement shape. Projections 74 define an inclined surface 76 at the top end of the U-complement shape which functions as a bearing surface. The angle of incline 78 is measured from surface 76 to a longitudinal plane normal to the partition wall. The angle of incline 78 should be in the range of about 10° to 20° (preferably 15°). The partition walls at the opposite end have a corresponding recess 80 to provide inclined bearing surfaces 82 when inserted into an adjacent similar conduit section. In one embodiment it has been found that a clearance tolerance of 0.010 inches (0.0254 cm.) between surfaces 76 and 82 facilitate telescopic engagement of adjacent similar conduit sections.

Partition walls 28 may also be similarly provided with incline projections 74 and recesses 80 at each end of the conduits at the points of intersection of the partition walls. Additional details concerning this method of construction are disclosed in U.S. Pat. No. 3,872,894, the portions of which are not inconsistent herewith being incorporated herein by this reference.

FIRST EMBODIMENT

FIGS. 5 and 6 illustrate a means to interlock and join together two adjacent conduit sections. Referring to FIG. 1, each conduit section has a bell end 40, a spigot end 42 opposite the bell end, and a barrel portion 44 between the two ends.

Referring to the bell end 40, it includes a shoulder and a skirt portion. The shoulder 46 has sufficient width to accommodate the lipped edge 48 of the spigot end 42 of an adjacent conduit section. The skirt 50 of the bell flares outward and away from the shoulder 46. Shoulder 46 tells the installer that the spigot end 42 has been fully inserted into the bell. In addition, it indexes the spigot to the bell so that the slots 52 (See FIG. 6) align with the channels 54 provided on the radial portions 26 of the conduit walls 20. The purpose of the channels and slots and the need for their alignment will be discussed in greater detail later.

The end of the bell or hoop section 56 is in the form of a right circular cylinder whose axis coincides with the axis of the barrel 44. The inside edge 58 of the bell is chamferred or bevelled. This edge treatment assists in the initial indexing of the spigot onto the bell. It also protects the lipped edge 48 of the spigot end from being damaged or chipped as the bell and spigot are mated together.

The features appearing on the spigot end 42 of the conduit section may be most generally defined by three adjacent, peripherally continuous, outwardly extending flanges. The first flange is at the extreme edge of the conduit and forms a lip 48. The inside leading edge 60 of the lip 48 is bevelled to a smooth edge to prevent chaffing of the wires or cables pulled through the conduit. The outside leading edge 62 of lip 48 is rounded. The rounded lip 48 rests against the shoulder 46 on the bell end 40 of an adjacent similar conduit section. The inside corner of the bell formed by the shoulder 46 and the skirt 50 has a fillet 64 to complement the rounded edge 62 of the lip 48 on the spigot end 42. The wall 66 of the first flange opposite the rounded lip 62 is shown at right angles to the conduit walls 20.

The second peripheral flange 68 is adjacent to, but spaced apart from the first flange or lip 48. The narrow space between these two flanges defines a peripheral groove or annulus 70 into which is inserted a gasket 73. An O-ring gasket is preferred. The wall of the second flange forming the annulus is shown at right angles to the conduit walls 20. Groove 70 may be of whatever cross-sectional geometry is necessary to seat the gasket.

It should be noted that in the invention described, a sealing means is provided by a gasket seated in a groove on the periphery of the spigot end. Such gaskets may also be carried in a groove provided in the interior of the bell end. Experience has shown, however, that it is more convenient and easier to mount this gasket in a groove on the spigot end in that reliance is placed upon tensile forces within the flexible gasket to hold the gasket in the seat provided by the groove. If the gasket were seated in a groove on the inside edge of the bell, then compressive forces would have to be relied upon to seat the gasket within the groove. Tensile forces, particularly in the case of gaskets such as O-rings are more appropriate and are recommended.

This second flange 68 has a width generally the same as the first flange. Because of the flare of the bell skirt 50 the outer transverse dimension 72 of the second flange 68 is generally greater than the outer transverse dimension of the lip 48. That portion 75 of the outer surface of the second flange 68 adjacent to the annulus 70 may be bevelled to correspond to the general contours of the inside of the skirt 50 of the bell. The gasket 73 is compressed when the spigot is forced into the bell and forms a seal between the two conduit sections preventing seepage of water and deterioration of the cables carried in the conduit or duct.

The third and final peripheral flange 79 is adjacent to the second flange 68 but spaced apart from it. Its walls are shown at right angles to the conduit walls 20. Its outer transverse dimenson 81 is generally greater than the outer transverse dimension 72 of the second flange 68, but generally less than the inner transverse dimension 83 of the hoop portion 56 of the bell. The gap 84 between the hoop 56 and the outer surface 86 of the third flange 78 defines the limits of hog and sag of two adjacent conduit sections joined together in a unified structure and subjected to shear loadings. The end of the bell 85 encompasses the third flange 79. The inside depth of the bell (sometimes called the depth of the socket) is equal to the distance between wall 88 on the third flange 79 to wall 90 of the first flange 48. The thickness of the third flange is generally the same as the thickness of the first and second flanges.

Referring to FIG. 2, a keylock means is used to mechanically connect or join two adjacent conduit sections. This keylock means features: open ended channels on the conduit walls at the spigot end; complementing slots or apertures on the radial elements of the bell end corresponding in location to the endpoints of the channels on the spigot end; and resilient pins or keys that pass through the keyways defined by the corresponding, complementary slots and channels. More generally, the complementary channels and slots provide a means for interlocking and aligning two adjacent conduit sections together prior to coupling. The channels on one spigot section cooperate with the slots on the bell of an adjacent conduit section forming a means for retaining the keys in place, thus coupling the two conduit sections together.

Referring to FIGS. 2, 5, and 6, channels 54 are shown formed on the radial elements 26 of the spigot end between the second 68 and the third flanges 79. These channels are defined by the following surfaces and points of reference:

(1) The channel bottom 96 subtends an arc 98 of approximately 20 degrees, with the axis of symmetry 100 of the channel being generally at 45 degrees to horizontal principal axis 25. The channel bottom 96 occupies a portion of the radial element 26 of the conduit walls (2) The channel ends 102 and 104 are shown at 60 degrees and 30 degrees respectively to the horizontal principal axis 25 and extend outwardly from the channel bottom 96;

(3) Faces 106 and 108 are formed by extending the outer surface of the parallel elements 22 and 24 of the conduit walls 20 until they intersect 110 the outer transverse dimension 72 of the second flange 68; and (4) The surfaces 112 and 114 are coincident with the outer surface 75 of the second flange 68, having line 110 and surface 102 (or 104) as lateral boundaries.

Before describing the slots 52 in the bell in detail, the key should be discussed with greater particularity since their dimension and size determines the dimension of the slots to a great extent.

The following discussion applies to both embodiments unless otherwise indicated.

The keys for the keyways are made of a resilient plastic, preferably full density polypropylene or polyethylene. A variety of forms may be used for the shape of the keys. FIG. 4 is a typical depiction of a key 94. By providing a protuberance 118 at one end of the key, the key is kept from being over driven or over inserted into the keyway in that the protuberance 118 acts as a stop to limit the travel of the key into the keyway. (See FIG. 2).

In addition, a pointed end 122 on the key will ensure that the key is easily inserted into the slots 53 and 55 formed on the bell end of the conduit section. (See FIG. 3). The point 122 also allows for the pin to snake its way through the keyway without suffering obstruction due to misalignments and imperfections in the slots and channels or slots and ridges forming the keyways. (These latter features will be described in detail later).

The key 94 is preferably rectangular in cross-section with the wider dimension 124 (width of the key) inserted parallel to the longitudinal axis of the conduit. This feature allows for preferential flexibility in the direction needed for the pin to bend while snaking its way through the keyway. It also provides strength by increasing the rigidity of the coupled conduits in a plane perpendicular to the longitudinal axis of the conduit. This resists the tendency of the conduits to undergo hogging or sagging when subjected to external forces or environmental effects.

One variation 126 of the key (See FIG. 10) employs a hook 128 at the end opposite the pointed end 122. This makes removing the pins and decoupling the conduit sections easier and more convenient. The stop function of a protuberance (See FIG. 4, item 118) is achieved when the fluke 129 or palmed portion of the hook comes into contact with the outer surface of the bell. Preferably, the hooked keys 126 are inserted with the flukes 129 pointing inward or towards the walls of the bell.

Returning to the detailed description of the first embodiment, the slots 53 and 55 in the bell correspond to the endpoints of the channel (See FIG. 6) and are defined by:

(a) two interior azimuthal surfaces 130 and 132 which are generally parallel to and in the same plane as the channel ends 102 and 104 respectively; and (b) two interior vertical surfaces 134 and 136 which are at right angles to horizontal principal axis 25 and intersect the inside of the bell at a distance from the channel ends 102 and 104 respectively, generally the same as, but slightly greater than, the shorter cross section 138 or thickness of a key. (See FIG. 4).

The width of the slots (See FIG. 5) is generally the same as the width 124 of the key (See FIG. 4). The centerline of the slots generally coincides with the centerline of the channel, but the width of the channel is preferably twice the width of the slot. This proportion provides a limited amount of flexing of the coupled conduits so they may follow the contours of the trench in which they are buried without affecting the seal provided by gasket 73 in contact with bell end 40. Limits of deflection in sagging are defined by the gap 84 between the inner lateral dimension 83 of the bell and the outer lateral dimension 81 of the third flange 79. Limits of deflection in hogging are defined by the gap 5 between surfaces 76 and 82. For the conduit system and the arrangement of U-shaped complementary surfaces previously described, a deflection of 1 degree 30 minutes would be obtained. This corresponds to a 2 percent grade variation in the excavation of the trench which is typical for such systems.

Depending on the degree of flexibility of the pin 94, the length of the channel bottom 96 may be varied. As the bottom subtends a greater degree of arc 98 surfaces 112 and 114 shrink until surfaces 102 and 104 intersect surfaces 106 and 108 respectively at line 110. Pin thickness 138 is generally the same as the depth of the second flange.

It should be realized that the dimensions of the key must be such that it fits snugly within its keyway. In accordance with the usual definition, a snug fit is the closest fit that can be assembled by hand for parts that do not move against each other. Referring to FIG. 2, as the key 94 is inserted into the keyway it is first bent out of its normal shape when it intersects the bottom 96 of the channel. As it passes through the channel, the body of the key rubs against the two interior surfaces of the first slot 53; in particular it rubs against the outer edge of azimuthal surface 130 and the inner edge of vertical surface 134. After the point 122 of the key 94 intersects the end 104 of the channel, the key is further deflected so as to pass through the second slot 55 forming the keyway. The key will of necessity rub against the inner edge of vertical surface 136 and the outer edge of azimuthal surface 132. Thus, a frictional bond is formed at five points: the outer edge of the two interior azimuthal surfaces of the channel slots, the inner edge of the two interior vertical surfaces of the channel slots, and the channel bottom. It should be understood that the key may be inserted from either end of the channels since the channel is defined by similar surfaces. The tightness of the fit is dependent upon flexibility of the material of the key, the angle of the channel faces, and hardness of the conduit material relative to the hardness of the material of the key.

SECOND EMBODIMENT

FIGS. 7 and 8 illustrate another means to interlock and join together two adjacent conduit sections. Here the body of the conduit section is identical to that previously described with the following exceptions:

(a) the bell end has a larger cylindrical hoop section;

(b) the lateral separation between the second and third flanges has been reduced;

(c) the third flange limits deflection of the coupled conduit by engaging the mid section of the bell end; and (d) in the place of channels, a series of parallel, paired ridges are used to direct the deflection of the key as it passes through the slots in the bell section so as to nest the key between paired sets of ridges.

Thus, the second embodiment is quite similar to the first embodiment previously described with some distinctive variations. Rather than describe the second embodiment in the same detail as was used for the first embodiment, only those differences or features of special interest will be described in detail. It may be otherwise assumed that the features of the second embodiment are as described under the first unless a special exception or statement is made.

Shoulder 46 serves the same purpose previously described under the first embodiment with the exception that it ensures that the alignment of the slots 252 (See FIG. 8) with the ridges 254 (instead of the channels) provided on the radial portions 26 of the conduit walls 20. It thus squarely seats the spigot end in the bell end.

Unlike the first embodiment, the hoop section 256 of the second embodiment occupies a much larger proportion of the bell end.

The second flange 268 has a width generally the same as the first flange. Because of the flare of the bell skirt 250, the outer transverse dimension of the second flange 272 is generally greater than the outer transverse dimension of the first flange or lip 48. That portion of the outer surface 275 of the second flange 268 immediately adjacent to the groove 70 is generally parallel to the conduit walls 20. Unlike the first embodiment, this surface 275 is not shown bevelled to match the flare of the interior of the bell.

The location of the third circumferential flange 279 generally corresponds to the location of the transition between the hoop 256 of the bell and the bell skirt 250. The inside surface 255 of this transition in the bell is bevelled to a smooth edge. The outer surface 286 of the third flange 279 is likewise bevelled so that the two surfaces 255 and 286 form a complementary interlocking structure.

Referring to FIG. 8, a keylock means is used to mechanically connect or join two adjacent conduit sections. The keylock means features: paired parallel ridges on the conduit walls on the spigot end; complementary slots or apertures in the hoop portion of the bell end corresponding in location to the end points or crests on the ridges on the spigot end; and resilient (preferably injection molded) keys that pass through the keyways defined by the corresponding complementary slots and ridges. The ridges and slots provide a means for interlocking and aligning two adjacent conduit sections together prior to coupling. The ridges on one spigot section cooperate with the slots on the bell of an adjacent conduit section forming a means for retaining the keys in place, thus coupling the two conduit sections together.

Referring to FIGS. 2, 7 and 8, ridges 254 are shown formed on the radial elements 26 of the spigot end 242 adjacent to, but spaced apart from the third flange 279. The slots 252 (See FIG. 8) are generally centered on the center line of the gap 241 between the two parallel ridges 254. The parallel ridges are defined by the following surfaces and points of reference:

(1) The valley 296 of the ridges corresponds to the channel bottom 96. The valley is shown in FIG. 2, as subtending an arc 98 of approximately 20 degrees with the axis of symmetry 100 of the valley being generally at 45° to the horizontal principal axis 25 for the particular conduit cross section illustrated. The valley occupies a portion of the surface of the radial elements 26 of the conduit walls 20;

(2) The faces 302 and 304 of each pair of parallel ridges are shown at 60 degrees and 30 degrees respectively to the horizontal principal axis 25 and extend outwardly from the valley 296;

(3) The tops or crests 310 and 311 of the paired parallel ridges 254 are formed by extending the outer surface of the parallel elements 22 and 24 of the enclosing wall means until they intersect the respective faces 302 and 304 of the ridges; and (4) The side walls of the ridges are shown at right angles to the enclosing wall means.

The distance between corresponding faces of the paired parallel ridges 254 is shown as generally being the same as the width of a key 124. It is important to realize that like the first embodiment the ridge faces (channel ends) merely direct the flexible key as it passes from the first slot in the bell to the second slot in the bell. Similarly, the frictional bond of the key is formed at four points on the slots of the bell and at one point on the valley portion (channel bottom) of the spigot. Furthermore, while two slots and two ridges (channel ends) are described, the same function could be achieved with one slot and one ridge (channel end). Two slots allow insertion of the keys from two sides of the conduit enclosure. Like the first embodiment, the depth or thickness of the key 138 substantially determines the location of end points of the slots.

The slots 53 and 55 in the bell (see FIG. 3) correspond to the location of the crests of the ridges and are defined by:

(a) The two interior azimuthal surfaces 330 and 310 which are generally parallel to and in the same plane as ridge faces 302 and 304 respectively; and (b) The two interior vertical surfaces 334 and 336 which are at right angles to the horizontal principal axis 25 and intersect the inside of the bell at a distance from ridge faces 302 and 304 respectively, generally the same as, but slightly greater than, the thickness 138 of a key. (See FIG. 4).

The width of the slots (see FIG. 7) is generally the same as the width 124 of the key. When the key is inserted, its pointed end becomes nested between the two sets of paired, parallel ridges. The reason for using paired ridges is to provide this nesting function. The key is thereby guided radially and longitudinally as it is pushed towards the second slot. Since the keys are made of full density polypropylene or polyethylene, they are relatively flexible compared to the conduit material and may be made to snugly fit into the keyway defined by the slots and ridges.

Since the second embodiment does not employ channels and since the slots and ridges may not be in perfect alignment, a means should be provided to direct the key radially while at the same time bringing the ridges and slots into alignment. For this reason the key shown in FIG. 9 is preferred. This design incorporates a flat side 150 and a long tapered side 151. The flat side is inserted along the bottom of the bell. As it is gradually inserted, the tapered side acts as a camming surface cooperating with the insides of the ridges to draw the bell and the spigot together.

It should be noted that one essential difference between the first and second embodiments is that the keylock means in the first embodiment is between the second and third flanges, while in the second embodiment the keylock means is separate and apart from the second flange.

In addition, the first embodiment achieves locking by virtue of the key 94 cooperating with the third flange 79. Thus, it relies upon longitudinal forces. The second embodiment, on the other hand, achieves a locking effect by virtue of the key frictionally coupling at the crest of the valley 350 between the two sets of ridges.

One disadvantage of the second embodiment is that the hoop 256 of the bell is relatively unsupported. Consequently, it is subject to, or may be subject to, damage resulting from forces placed upon the base of the bell. However, the overriding advantage of the second embodiment over the first embodiment is that since the keylock means is not nested between the second and third flanges the third flange blocks dirt, silt or water from reaching the gasket. In the second embodiment, such foreign matter must pass by the third flange before it can reach the gasket. In the first embodiment, dirt and other foreign material may accumulate between the second and third flanges by virtue of entering through the slots. Thus, the second embodiment effectively separates the keylock means from the sealing means and potentially provides a better sealing effect. In this regard, the small groove 305 between the second and third flange acts like a dirt leg or trap to collect seepage and silt. Depending on the application and the surrounding soil conditions, one embodiment may be preferred over the other. For example, in dry, rocky soils the first embodiment may be preferred.

Numerous other advantages and features of the present invention will become readily apparent from the following detailed description of the invention and of the embodiments described, from the claims and from the accompanying drawings in which each and every detail shown is fully and completely disclosed as part of the specification.

While the preferred embodiment is illustrated as being an essentially round tube over its entire length, it is possible to incorporate the features of this invention in a length of pipe in which the cross section has a non-circular interior or a non-circular exterior or both. Furthermore, the precise shape of the exterior integral reinforcing flanges and ribs can be varied. It is also possible to vary the spacing of other parts. Furthermore, a circular cross section is included since a circle is the special case of a polygon with an infinite number of sides and a cylinder has circular ends joined by straight line segments.

The length of pipe of this invention can be fabricated in a length other than those having single straight line longitudinal access. For example, a length of pipe fitting such as an "L", a "Y", a reducer, a "T", a lateral, and the like. Likewise, a pipe as disclosed herein can be connected to a fitting or the like by cutting the pipe length and connecting the cut pipe length through the fitting in the manner described.

Suitable materials may consist of polyethylene or polypropylene. Preferred materials are: structural foam made of polyolefin plastic, for the conduit section; neoprene, for the gasket; and a full density polyolefin plastic for the coupling collar. Injection molding may be used to form the conduit and the collar. The neoprene gasket assures water and silt free seal; neoprene posesses long-term resiliency without becoming hard or brittle. Full density linear polyethylene is transformed by a foaming agent into the so-called structural plastic which is lighter and less dense than the so-called full density polyethylene. Structural foam offers several advantages over full density injection molded plastic; flexural rigidity can be increased as much as four times over that of a solid part of equal weight. For polyethylene, it is well-known that as density increases, so does tensile strength, hardness, rigidity, and heat resistance.

From the foregoing, it will be observed that numerous variations and modifications may be effected without departing from the true spirit and scope of the novel concept of the invention. It is, of course, intended to cover by the appended claims all such modifications as fall within the scope of the claims.

I claim:

1. A connection for two conduit sections each of which is formed from a plurality of integrally formed plastic enclosing walls defining an elongated, open ended passageway therein, comprising: an integral bell portion at one end of one of said two conduit sections and an integral spigot portion at one end of the second conduit section with the outer transverse dimensions of the free end of said spigot portion corresponding to the inner transverse dimensions of said bell portion whereby said two conduit sections mate together; a peripheral, outward extending lip at the free end of said spigot portion, said lip having outer transverse dimensions generally equal to the inner transverse dimensions of the bell portion to support the free end of said bell portion and to index said spigot portion to the bell portion; a first peripheral flange at the spigot portion and adjacent to—but spaced apart from—said lip, said first flange having outer transverse dimensions generally corresponding to the inner transverse dimensions of the corresponding location in said bell portion; a second peripheral flange at the spigot portion adjacent to—but spaced apart from—said first flange, second second flange having outer transverse dimensions generally corresponding to the inner transverse dimensions of the corresponding location in said bell portion of, said first flange lying between said lip and said second flange, whereby said first flange, said second flange and said lip on said first conduit section cooperate with the bell portion on said second conduit section to align both conduit sections together;

a gasket seated within the annulus defined by the adjacent sides of said first flange and said lip, said gasket being of a dimension relative to the outer transverse dimensions of said lip and said first flange to engage the inner surface of the bell portion thereby sealing the joint between the bell portion and the spigot portion of said two conduit sections; and means for interlocking said one conduit section relative to said second conduit section including: retention means on the exterior surfaces of said spigot portion between said first and second flanges; a plurality of paired apertures in the bell portion adapted in position to be aligned with said retention means, said paired apertures and said retention means cooperating together to define a plurality of openings with ends defined by the paired apertures in said bell portion and with a mid-section defined by the exterior surfaces of said spigot portion; and a plurality of keys snugly extending through each of said paired apertures and into said retention means thereby mechanically joining said two conduit sections, said keys being formed from a generally straight length of resilient plastic material, the longitudinal axis of said keys—when inserted into the opening defined by said paired apertures and said retention means—being deformed so as to define a curved line segment, whereby said keys present a convex aspect relative to the longitudinal axis of said conduit sections in holding said conduit sections together.

2. The conduit section connection of claim 1, wherein said retention means includes said spigot portion with a plurality of arc-like channels having a base formed by said enclosing walls, having side walls defined by said first and second flanges, and having end faces inclined to and directed outwardly aw. from said base, said arc-like channels presenting a convex aspect relative to the longitudinal axis of said conduit, at least one of the paired apertures defining each of said openings having an interior edge portion between the exterior of said bell portion and the exterior of said spigot portion, said end faces being positioned relative to the interior of said bell portion to force a portion of the peripheral surface of said keys into engagement with the interior edges of said apertures, whereby upon insertion of the spigot portion into said bell portion and upon insertion of said keys into said openings, said two conduit sections are interlocked together.

3. The conduit section connection of claim 1, wherein said second flange is bevelled at its leading edge and the corresponding interior surface on said bell portion is bevelled to receive said bevelled flange so as to form a complementary interlocking pair of surfaces and wherein said retention means includes a plurality of paired, parallel ridges formed on the periphery of said spigot portion and adjacent to said second flange but on the side of said second flange opposite to said sealing means each of said ridges defining a face disposed towards the apertures forming the ends of said opening with the bases of said faces being joined together by an exterior surface on said one conduit section, at least one of the paired apertures defining each of said openings having an interior edge portion between the exterior of said bell portion and the exterior of said spigot portion, the crests of said ridges being sufficiently spaced from the interior of the bell portion to force a portion of the peripheral surface of the keys that are inserted into said openings into engagement with said interior edges, whereby upon insertion of the spigot portion into said bell portion and upon the insertion of said keys into said openings, said two conduit sections are interlocked together.

4. The conduit section of claim 1, wherein each of said keys is a generally straight flexible shaft of generally rectangular cross-section having a hook-like protuberance at one end and a point at the other end, said keys having a length substantially less than the perimeter of the outside surface of said conduit enclosing walls between said lip and said first flange, whereby the hooked end of said key limits the degree of insertion of said key and the rectangular cross section of said key increases the rigidity of the two interlocked conduit sections.

5. In a plastic conduit section adapted for connection to an adjacent similar conduit section of the type having: elongated wall means defining a passageway therein; a spigot portion at one end of said wall means and integral therewith; means, defining a bell portion integral with said wall means and at the other end thereof, for permitting the insertion of the spigot portion of said adjacent similar conduit section, the outer transverse dimensions of said spigot portion at the free end thereof being generally equal to the inner transverse dimensions of said bell portion at a section opposite the free end thereof so as to support said spigot portion thereon; a flange integral with and spaced apart from the free end of said spigot portion, the outer transverse dimensions of said flange corresponding to the inner transverse dimensions of the corresponding bell portion of said adjacent similar conduit section so as to support the bell portion when said spigot portion is inserted therein; and an annular, resilient sealing gasket carried by the spigot portion of said conduit section, said gasket having its inside face engaging and sealing said spigot portion and its outer face engageable with the bell portion of said adjacent similar conduit section for sealing engagement therewith, the improvement which comprises:

a spigot portion having a plurality of external, arc-like, open-ended channels positioned between said gasket and said flange; a bell portion having a plurality of paired slots corresponding in location to the end points of said channels on said spigot portion, whereby upon the insertion of the spigot portion of said adjacent similar conduit section a plurality of keyways is defined by the complementary channels and slots; and a plurality of resilient injection molded keys snugly fitting within said keyways thereby mechanically joining together said two adjacent similar conduit sections, said keys before being inserted into said keyways being generally straight and having a length substantially less than the inside perimeter of said bell portion, said keys when inserting into said keyways being deformed so as to present a convex aspect relative to the longitudinal axis of said conduit sections, the distance between the ends of said channels and the corresponding interior edges of said slots being generally less than the thickness of said keys, whereby said keys are held within said keyways by an interference fit, the friction between exterior surfaces of said keys and the interior edges of said slots mechanically resisting removal of said keys from said keyways.

6. In a plastic conduit section for connection to an adjacent similar conduit section of the type having: an elongated wall means defining a passageway therein; a spigot portion at one end of said wall means and integral therewith; means, defining a bell portion integral with said wall means and at the other end thereof, for permitting the insertion of the spigot portion of said adjacent similar conduit section, the outer transverse dimensions of said spigot portion at the free end thereof being generally equal to the inner transverse dimensions of said bell portion at a section opposite the free end thereof so as to support said bell portion thereon; a flange integral with and spaced apart from the free end of said spigot portion, the outer transverse dimensions of said flange corresponding to the inner transverse dimensions of the corresponding bell portion of said adjacent similar conduit section so as to support the bell portion when said spigot portion is inserted therein; and an annular resilient sealing gasket carried by the spigot portion of said conduit section, said gasket having its inside face engaging and sealing said spigot portion and its outer face engageable with the bell portion of said adjacent similar conduit section for sealing engagement therewith, the improvement which comprises:

a spigot portion having a plurality of external, paired parallel ridges positioned between said annular resilient sealing gasket and said flange; a bell portion having a plurality of paired slots, each pair of slots corresponding in location to each pair of ridges, each ridge having a face outwardly disposed towards the interior of its corresponding slot with the faces of each ridge pair diverging outwardly from each other, whereby upon insertion of the spigot portion of said adjacent similar conduit section a plurality of keyways is defined by the complementary paired parallel ridges and slots, the crest of said ridges being outwardly disposed towards the interior edges of said slots; and a plurality of resilient injection molded keys snugly fitting within said keyways, said keys before being inserted into said keyways being generally straight and having a length substantially less than the perimeter of said spigot portion, the distance between the crest of said ridges and the interior edges of said slots being generally less than the thickness of said keys, whereby said keys said keys when inserted into said keyways present a convex aspect relative to the longitudinal axis of said conduit sections and mechanically join together two adjacent conduit sections with said keys being held in frictional engagement with said bell portion and said spigot portion.

7. A conduit section connection for two conduit sections each of which is formed from a plurality of integrally formed enclosing walls defining an open-ended passageway therein, comprising: an integral bell portion at one end of one of said two conduit sections and an integral spigot portion at one end of the second conduit section with the outer transverse dimensions of the free end of said spigot portion corresponding to the inner transverse dimensions of said bell portion whereby said two conduit sections mate together; a seating surface at the free end of said spigot portion, said seating surface having outer transverse dimensions generally equal to the inner transverse dimensions of the bell portion to support the free end of said bell portion and to index said spigot portion to the bell portion; a peripheral flange on the spigot portion adjacent to and spaced apart from said seating surface, said flange having outer transverse dimensions generally corresponding to the inner transverse dimensions of the bell portion to limit misalignment between said conduit sections when they are joined together; sealing means, adjacent to said seating surface, for sealing the joint between said bell portion and said spigot portion; and keylock means for mechanically joining and interlocking together two conduit sections, said key lock means including a plurality of removable resilient injection molded keys, said keys being removed to join said two conduit sections together, said keys when placed in position so as to lock together said two conduit sections presenting a convex aspect relative to the longitudinal axis of said conduit sections, each of said keys having a length substantially less than the perimeter of said conduit sections;

a plurality of open-ended channels on said spigot portion between said sealing means and said flange, said channels presenting a convex aspect relative to the longitudinal axis of said conduit section; and a plurality of paired slots on said bell portion corresponding in location to the ends of said channels, whereby upon insertion of the spigot portion into the bell portion a plurality of keyways are defined by said complementary channels and slots, said plurality of resilient keys snugly fitting within said keyways.

8. A conduit section connection for two conduit sections each of which is formed from a plurality of integrally formed enclosing walls defining an open-ended passageway therein, comprising: an integral ball portion at one end of one of said two conduit sections and an integral spigot portion at one end of the second conduit section with the outer transverse dimensions of the free end of said spigot portion corresponding to the inner transverse dimensions of said bell portion, whereby said two conduit sections mate together; a seating surface at the free end of said spigot portion, said seating surface having outer transverse dimensions generally equal to the inner transverse dimensions of the bell portion to support the free end of said bell portion and to index said spigot portion to the bell portion; a peripheral flange on the spigot portion adjacent to but spaced apart from said seating surface, said flange having outer transverse dimensions generally corresponding to the inner transverse dimensions of the bell portion to limit misalignment between said conduit sections when they are joined together; sealing means, adjacent to said seating surface, for sealing the joint between said bell portion and said spigot portion; and keylock means for mechanically joining and interlocking together two conduit sections, said key lock means including:

- a plurality of removable resilient injection molded keys, said keys being removed to join said two conduit sections together, said keys when placed in position so as to lock together said two conduit sections presenting a convex aspect relative to the longitudinal axis of said conduit sections, each of said keys having a length substantially less than the perimeter of said conduit sections;
- a plurality of paired outward extending ridges formed on the periphery of said spigot portion and adjacent to said flange but on the side of said flange opposite to said sealing means; and
- a plurality of paired slots, on the bell portion of said conduit enclosing walls, corresponding in location to the faces of said paired ridges, that portion of said conduit enclosing walls between said ridges presenting a convex aspect relative to the longitudinal axis of said conduit sections, whereby upon insertion of the spigot portion into said bell portion, a plurality of keyways are defined by said corresponding ridges and slots, said plurality of resilient keys snugly fitting within said keyways.

9. A conduit section for connection to similar conduit sections using a plurality of flexible plastic keys the length of which are substantially less than the perimeter of the ends of said conduit section, comprising: a plurality of injection molded plastic enclosing walls having first and second pairs of generally flat parallel walls having adjacent ends interconnected by radial elements to define an elongated open ended, smooth surfaced, generally rectangular passageway therein with partition wall means integral with said enclosing wall means for dividing the interior of said rectangular passageway into a plurality of elongated passageways; an integral bell portion at one end of said enclosing walls and an integral outwardly tapered spigot portion at the other end of said enclosing walls with the outer transverse dimensions of the free end of said spigot portion corresponding to the inner transverse dimensions of said bell portion whereby two adjacent similar conduit sections mate together; a first peripheral flange, at the edge of said spigot portion, having side walls generally perpendicular to said enclosing walls thereby defining a lip at the free end of said spigot portion, said lip having outer transverse dimensions generally equal to the inner transverse dimensions of the corresponding bell portion to support the bell portion of an adjacent similar conduit section, the leading edge of said lip being rounded to a smooth surface to index said spigot portion to the bell portion of an adjacent similar conduit section; a second peripheral flange on the spigot portion, adjacent to but spaced apart from said lip, said second flange having side walls generally perpendicular to said enclosing walls, and having outer transverse dimensions generally corresponding to the inner transverse dimensions of the corresponding location on the bell portion of an adjacent similar conduit section; a third peripheral flange on the spigot portion, adjacent to but spaced apart from said second flange, said third flange having outer transverse dimensions generally corresponding to the inner transverse dimensions of the corresponding location on the bell portion of an adjacent similar conduit section thereby limiting the misalignment between two mated together conduit sections, and having side walls generally perpendicular to said enclosing walls; an annular resilient gasket corresponding in shape to the annulus defined by the adjacent parallel sides of said first and second flanges and carried therein with the outer surface of said gasket being engageable with the inner surface of the bell portion of an adjacent similar conduit section to seal the joint between the bell and the spigot portions of two adjacent mated together conduit sections; and keylock means for mechanically joining said two adjacent similar conduit sections, said keys when inserted into said keylock means presenting a convex aspect relative to the longitudinal axis of said two conduit sections, said keylock means interfacing between the bell portion and the spigot portion of two similar conduit sections such that said keys are disposed entirely within the spigot portion or the bell portion but not both simultaneously, said keylock means including:

- radial elements of said spigot portion between said second and third flanges having a plurality of external, arc-like, open ended channels with a base formed by said conduit enclosing walls, said channels being symmetrically located about said radial elements, each of said channels defining end faces inclined to and directed outwardly and away from the channel base, whereby said channel base presents a convex aspect relative to the longitudinal axis of said conduit section; and
- radial elements of the bell portion having a plurality of paired slots corresponding in location to the end faces of said channels and having end surfaces extending from the projections of the ends of said channels, whereby upon insertion of the spigot portion of a similar conduit section, a plurality of keyways are formed by the complementary channels and slots said keys snugly fitting within said keyways,
- said keys having a generally rectangular cross section, said keys being inserted into said keyways such that the wide dimension of each key is parallel to the longitudinal axis of said conduit section and the narrow dimension of each key is perpendicular to the longitudinal axis of said conduit section so as to impart longitudinal rigidity to said two mated together similar conduit sections.

10. A conduit section for connection to similar conduit sections using a plurality of flexible plastic keys the length of which are substantially less than the perimeter of the ends of said conduit section, comprising: a plurality of injection molded plastic enclosing walls having first and second pairs of generally flat parallel walls having adjacent ends interconnected by radial elements to define an elongated open ended, smooth surfaced, generally rectangular passageway therein with partition wall means integral with said enclosing wall means for dividing the interior of said rectangular passageway into a plurality of elongated passageways; an integral bell portion at one end of said enclosing walls and an integral outwardly tapered spigot portion at the other end of said enclosing walls with the outer transverse dimensions of the free end of said spigot portion corresponding to the inner transverse dimensions of said bell portion whereby two adjacent similar conduit sections mate together; a first peripheral flange, at the edge of said spigot portion, having side walls generally perpendicular to said enclosing walls thereby defining a lip at the free end of said spigot portion, said lip having outer transverse dimensions generally equal to the inner transverse dimensions of the corresponding bell portion to support the bell portion of an adjacent similar conduit section, the leading edge of said lip being rounded to a smooth surface to index said spigot portion to the bell portion of an adjacent similar conduit section; a second peripheral flange on the spigot portion, adjacent to but spaced apart from said lip, said second flange having side walls generally perpendicular to said enclosing walls, and having outer transverse dimensions generally corresponding to the inner transverse dimensions of the corresponding location on the bell portion of an adjacent similar conduit section; a third peripheral flange on the spigot portion, adjacent to but spaced apart from said second flange, said third flange having outer transverse dimensions generally corresponding to the inner transverse dimensions of the corresponding location on the bell portion of an adjacent similar conduit section thereby limiting the misalignment between two mated together conduit sections, and having side walls generally perpendicular to said enclosing walls; an annular resilient gasket corresponding in shape to the annulus defined by the adjacent parallel sides of said first and second flanges and carried therein with the outer surface of said gasket being engageable with the inner surface of the bell portion of an adjacent similar conduit section to seal the joint between the bell and the spigot portions of two adjacent mated together conduit sections; and keylock means for mechanically joining said two adjacent similar conduit sections, said keys when inserted into said keylock means presenting a convex aspect relative to the longitudinal axis of said two conduit sections, said keylock means interfacing between the bell portion and the spigot portion of two similar conduit sections such that said keys are disposed entirely within the spigot portion or the bell portion but not both simultaneously, said keylock means including:

a plurality of paired, parallel ridges formed on the periphery of the radial elements of said spigot portion and extending from the flat parallel walls of said enclosing walls, each of said ridges defining two side walls and a face, each face of said pair being disposed outwardly divergent relative to a plane passing through the longitudinal axis of the conduit section and midway between each pair of ridges; and radial elements on the bell portion of said enclosing walls having a plurality of paired slots corresponding in location to the faces of said ridges, whereby upon inserting the spigot portion into the bell portion of a similar conduit section, a plurality of keyways is defined by the corresponding ridges and slots, said keyways presenting a convex aspect relative to the longitudinal axis of said conduit sections, said keys snugly fitting within said keyways and being nested between said paired parallel ridges.

* * * * *